United States Patent [19]

Cochran et al.

[11] 4,299,619

[45] Nov. 10, 1981

[54] ENERGY EFFICIENT PRODUCTION OF ALUMINUM BY CARBOTHERMIC REDUCTION OF ALUMINA

[75] Inventors: C. Norman Cochran, Oakmont; Nancy M. Fitzgerald, Pittsburgh, both of Pa.

[73] Assignee: Aluminum Company of America, Pittsburgh, Pa.

[21] Appl. No.: 125,644

[22] Filed: Feb. 28, 1980

[51] Int. Cl.$^3$ .............................................. C22D 3/12
[52] U.S. Cl. ................................ 75/10 R; 75/68 A
[58] Field of Search ............................ 75/68 A, 10 R

[56] References Cited

U.S. PATENT DOCUMENTS

| | | | |
|---|---|---|---|
| 2,974,032 | 3/1961 | Grunert et al. | 75/10 R |
| 2,978,315 | 4/1961 | Schenck et al. | 75/10 R |
| 3,723,093 | 3/1973 | Shiba et al. | 75/10 R |
| 3,971,653 | 7/1976 | Cochran | 75/10 R |
| 4,033,757 | 7/1977 | Kibby | 75/10 R |
| 4,099,959 | 7/1978 | Dewing et al. | 75/10 R |
| 4,216,010 | 8/1980 | Kibby | 75/68 A |

*Primary Examiner*—M. J. Andrews
*Attorney, Agent, or Firm*—Glenn E. Klepac

[57] ABSTRACT

A method for production of aluminum by carbothermic reduction of $Al_2O_3$ in a stack-type reactor. A charge of $Al_2O_3$ and C is inserted into an upper reaction zone of the reactor and reacted at an elevated temperature to form CO and a first liquid comprising $Al_2O_3$ and $Al_4C_3$. The first liquid is transferred to a lower reaction zone beneath the upper reaction zone and heated to form CO and a second liquid of Al and C. A portion of the second liquid is removed, and liquid Al is extracted therefrom. In a preferred method, $Al_2O_3$ and C in the upper zone are heated by partial combustion of the C, and the lower zone is heated electrically. Gaseous Al and $Al_2O$ formed in the lower zone are reclaimed in the upper zone. Gaseous CO produced in both zones heats the $Al_2O_3$ and C in the upper zone. Excess CO is removed from the upper zone and used for generation of electricity or chemical process use. Liquid $Al_4C_3$ separated from the second liquid is returned to the upper zone. Production of 1.00 kg Al requires an expenditure of 32.7 megajoules (MJ) of electrical energy, and 3.45 kg C. Total consumption of electrical energy and carbon energy equivalent is 121 MJ/kg Al, compared with 186 MJ/kg Al using the best Bayer-Hall technology.

12 Claims, 2 Drawing Figures

ENERGY EFFICIENT PRODUCTION OF ALUMINUM BY CARBOTHERMIC REDUCTION OF ALUMINA

BACKGROUND OF THE INVENTION

The present invention relates to an energy efficient method for production of aluminum metal by reduction with carbon of the oxygen-bound aluminum in $Al_2O_3$.

Numerous individuals have previously recognized that considerable energy and capital savings are theoretically obtainable in producing aluminum by direct reduction of $Al_2O_3$. Several prior art patents describe processes for production of aluminum by carbothermic reduction. In addition, a few companies have invested heavily in pilot processes aimed at making aluminum by carbothermic reduction. However, there does not yet exist a commercial process for production of aluminum metal by carbothermic reduction in spite of the considerable efforts of prior art investigators.

One major difficulty associated with prior art carbothermic reduction processes is that they have relied upon electrically heated furnaces as a major source of energy. It is well known that when electricity is produced by combustion of fossil fuels, only a minor portion of the heat value of the fuel is recovered as electricity. Accordingly, prior art electrically powered processes for carbothermic reduction of aluminum from $Al_2O_3$ are relatively wasteful of energy.

In Cochran U.S. Pat. No. 3,971,653, issued July 27, 1976, one of the inventors of the present invention described a two-stage process for carbothermic production of aluminum by direct reduction of alumina. The present method differs from the process of the Cochran patent in that there is herein described a method using a stack-type reactor for increasing the energy efficiency of the Cochran process and for reducing product losses. The present invention relies upon the same principal chemical reactions underlying the Cochran process, and, to the extent not inconsistent herewith, the disclosure of said U.S. Pat. No. 3,971,653 is incorporated by reference.

Dewing et al U.S. Pat. No. 4,099,959 discloses a carbothermic reduction process for aluminum production having a first step in which aluminum carbide is produced, and a second step in which aluminum carbide and alumina are reacted at a temperature higher than that of the first step to yield aluminum. Heated gaseous carbon monoxide evolved in both steps is used to preheat the reactants. However, rather than providing a stack reactor, Dewing et al prefer to perform the first step in a low temperature zone and the second step in a high temperature zone, with the two zones being at different locations on generally the same level. The reaction is performed by circulating a stream of molten slag through successive low and high temperature zones. The reactants are not heated by partial combustion of carbon so that a major proportion of energy requirements must be met by electricity.

In Kibby U.S. Pat. No. 4,033,757, there is described a carbothermic reduction process carried out in a carbon arc furnace achieving a temperature of about 2100° C., as shown in FIG. 1 of the Kibby patent. The furnace is fed with $Al_4O_4C$ (equivalent to $4 Al_2O_3 + Al_4C_3$) and C in a composite charge having a mole ratio of oxygen to carbon of about 1:1. The arc furnace forms aluminum containing no more than about 10% by weight of aluminum carbide. Volatile products pass upwardly through the composite charge, further reacting to form liquid aluminum or compounds capable of forming liquid aluminum through still other reactions.

In columns 3 and 4, Kibby teaches a prereduction step for converting alumina and coke or coal to $Al_4O_4C$ at a temperature of about 1900° to 1950° C. The reactants are shaped into briquettes and placed in a shaft furnace which may be heated electrically or by combustion of additional carbon with oxygen. There is no suggestion in Kibby that the shaft furnace of the prereduction step and the carbon arc furnace of FIG. 1 should be combined to form a single shaft furnace having upper and lower reaction zones for carrying out both steps of the process. The two steps are carried out separately rather than being combined into a single shaft furnace as in the energy efficient method of the present invention.

In Grunert et al U.S. Pat. No. 2,974,032 there is shown a process for carbothermic reduction of alumina wherein an initial stage of the process is carried out in an electric arc furnace at a temperature above 2300° C. An aluminum-aluminum carbide system is tapped from the first stage, and the system is added to a flux at a temperature below 1000° C. for recovery of aluminum. Operation at temperatures above 2300° C. makes the Grunert process less energy efficient than the method of the present invention.

Shiba et al U.S. Pat. No. 2,723,093 discloses a process for recovery of liquid aluminum from an $Al-Al_4C_3$ liquid. An electric arc maintains the liquid at a temperature of about 2100° to 2500° C. in a high temperature zone, but recovery of aluminum from the liquid requires formation of a low temperature zone at about 1400° to 1900° C. FIG. 1 of the Shiba et al patent shows a charge of $Al_2O_3$ and C at a higher level in an electric furnace than the $Al-Al_4C_3$ liquid. However, Shiba et al do not suggest a two-stage process for conversion of the solid charge to the liquid with the first stage being carried out at a lower temperature than the second stage.

It is a principal object of the present invention to provide a method for carbothermic production of aluminum having improved energy efficiency compared with prior art processes.

It is a related object of the present invention to provide a method for carbothermic production of aluminum from $Al_2O_3$ wherein only a minor portion of the process energy is provided by electricity, and a major portion is provided by combustion of C.

A further object of the invention is to meet electrical requirements of the method by combustion of by-product CO.

Another object of the invention is to provide a stack-type reactor having two zones, one above the other, for performing the method of the invention.

Additional objects and advantages of the invention will become apparent to persons skilled in the art from the following specification.

SUMMARY OF THE INVENTION

The foregoing objects and advantages of the present invention are achieved by providing a stack-type reactor having an upper reaction zone and a lower reaction zone beneath the upper reaction zone. A charge of $Al_2O_3$ and C is inserted into the upper zone and heated to an elevated temperature, thereby forming CO and a first liquid comprising $Al_2O_3$ and $Al_4C_3$.

The first liquid is transferred to a lower reaction zone wherein it is heated to a higher temperature than in the upper zone, thereby forming CO and a second liquid of Al and C. A portion of the second liquid is removed from the lower zone for separation of aluminum metal therefrom.

In a preferred embodiment, gases formed in the lower zone are allowed to recycle to the upper zone to heat the reactants and to reclaim gaseous Al and Al₂O. Gaseous CO rises from the lower zone to the upper zone and is removed from a topmost portion of the upper zone after it has heated the reactants. Liquid Al₄C₃ separated from the second liquid is returned to the upper zone.

A preferred reaction temperature in the upper zone is about 2050° C., with heat being partially supplied by internal combustion of C. The lower zone is preferably heated electrically to a temperature of about 2100° C.

DETAILED DESCRIPTION OF A PREFERRED EMBODIMENT

Figure 1:
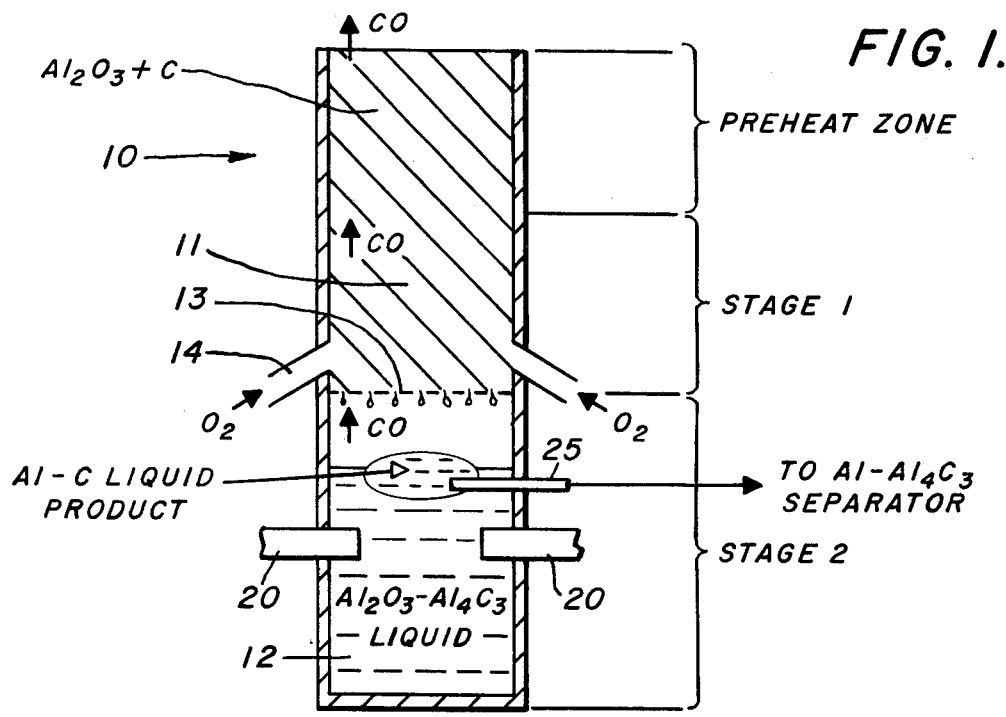
FIG. 1 is a schematic, cross-sectional view of a stack-type reactor for performing the energy efficient method of the invention.
Figure 2:
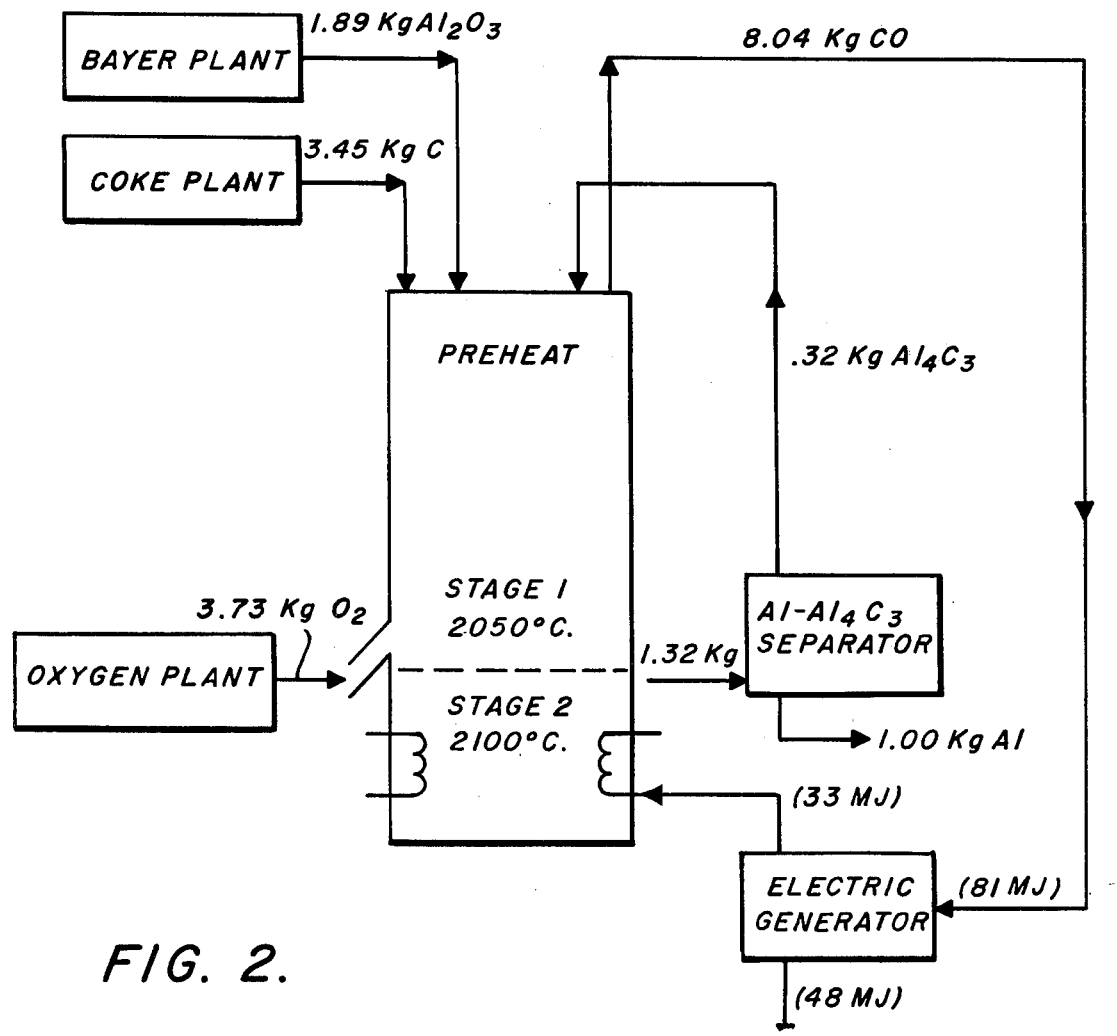
FIG. 2 is a flow diagram illustrating the raw material and energy requirements for the energy efficient method of the invention.

The energy efficient carbothermic reduction process of the present invention is preferably practiced by providing a stack-type reactor or shaft furnace 10, as shown in FIG. 1. The reactor 10 is divided into an upper reaction zone 11 and a lower reaction zone 12 beneath the upper zone 11. The side walls of the furnace 10 are lined by a refractory material resistant to high temperatures at which the method of the invention is practiced. In the preferred embodiment described, the side walls define a generally cylindrical reactor 10.

A grate or screen 13 separates the upper zone 11 from the lower zone 12. The grate 13 supports a solid charge of intermixed Al₂O₃ and C in the upper zone 11 without permitting passage of any substantial part of the solid charge. Some preferred sources of C are coal coke, petroleum coke and pitch coke. In a preferred embodiment, C is supplied to the upper zone 11 substantially in excess of the three moles C to one mole Al₂O₃ ratio theoretically needed for reaction between these two reactants. The excess is required for supplying heat by combustion. The grate 13 permits downward passage of liquids formed by reaction in the upper zone 11, as well as permitting upward passage of gases formed in the lower zone 12.

A plurality of oxygen inlets or inlet means 14 extends through the wall of the furnace 10 above the grate 13. Oxygen is admitted through the inlets 14 to preheat reactants in the upper zone 11 when starting the reaction and thereafter only as needed to maintain a desired reaction temperature in the upper zone 11. Oxygen must be introduced into the upper zone 11 in such a manner that either sufficient carbon is available to react with the oxygen in the upper zone 11, or the upward sweep of carbon monoxide through the reactor prevents a downward flow of oxygen from reaching the lower zone 12. Oxygen admitted through the inlets 14 may be in the form of air, pure oxygen or other oxygen sources.

The solid reactants in the upper zone 11 are commercially pure Al₂O₃ and carbon (for both heat and reduction) added to the top of the furnace 10 together with Al₄C₃ from the lower zone 12. A composition ratio of 15.5 moles C to one mole Al₂O₃ in the upper zone 11 is used in the preferred method summarized in Table 1 (see below). Carbon monoxide is removed from the top or topmost portion of the upper zone 10 and fed to an electric generating facility where only approximately 41% of the electricity produced is consumed by the process. Optionally, the CO may be used as a reactant in a chemical process.

The lower zone 12 is preferably electrically heated by an electric resistance heater symbolized by a pair of opposed electrodes 20. Alternative heat sources are an electric arc using electrodes that minimize introduction of carbon for chemical reaction, nuclear reactor heat, or other heat sources not producing large volumes of gas.

Chemically, the method of the invention consists of two main steps or stages. At the temperature of approximately 2050° C. maintained in the upper zone 11, the Al₂O₃ and C react to form an Al-O-C first liquid. When this first liquid is heated an additional 50° C. to 2100° C., a decomposition reaction to an Al-C second liquid occurs. The two stages of the reaction can be summarized as follows:

Stage 1

$$3\,Al_2O_3 + 9\,C \xrightarrow{2050°\,C.} (Al_2O_3\text{—}Al_4C_3)_{liq} + 6\,CO$$

Stage 2

$$(Al_2O_3\text{—}Al_4C_3)_{liq} \xrightarrow{2100°\,C.} (Al\text{—}C)_{liq} + CO$$

The Al-C second liquid is immiscible with and less dense than the Al-O-C first liquid and floats on top of the first liquid after formation. A portion of the Al-C second liquid is tapped or siphoned through a liquid outlet 25 for separation into liquid aluminum and Al₄C₃. The Al₄C₃ may be separated from the aluminum by filtration, flotation, pressing, centrifuging or other means for return to the upper zone 11. Separated Al₄C₃ is recycled to the top of the upper zone 11. Additions of Al₂O₃ and C to the upper zone 11 are made at a rate equivalent to the formation rate of the Al-C second liquid in the lower zone 12.

Substantial savings in energy and materials are achieved by performing the method of the invention in a shaft reactor. Gaseous CO, Al and Al₂O formed in the lower zone 12 are carried upwardly to the upper zone 11, thereby reclaiming both the aluminum and energy content of these gases. The hot rising CO preheats incoming solids as the CO cools. Gaseous Al and Al₂O are both reclaimed in the upper zone 11 in reactions such as, but not limited to, Al₂O reacting with CO to form Al₂O₃ and Al₄C₃ and gaseous Al condensing to form a liquid. The method becomes energy self-sufficient when supplied with coke because CO emanating from the top of the upper zone 11 is routed to a generator which provides more than enough electricity for the reaction occurring in Stage 2.

A mass balance summary for production of two gram-moles of aluminum by the preferred method of the invention is shown in Table 1.

TABLE 1

| Mass Balance Mole Basis: 2 g-moles Al produced (54 g) | | | | |
|---|---|---|---|---|
| | moles | grams | | g/g Al |
| Al₂O₃ | 1.0 | 102.0 | 73.9% | 1.89 |
| C, reduction | 3.0 | 36.0 | 26.1% | .67 |
| C, heat | 12.5 | 150.0 | | 2.78 |
| | | | | 3.45 |

TABLE 1-continued

Mass Balance
Mole Basis: 2 g-moles Al produced (54 g)

|  | moles | grams | g/g Al | |
|---|---|---|---|---|
| $O_2$ | 6.3 | 201.6 | 3.73 | |
| CO, reduction | 3.0 | 84.0 | 1.56 | |
| CO, heat | 12.5 | 350.0 | 6.48 | 8.04 |
| ($Al_4C_3$) | (.12) | (17.3) | (.32) | recycled |
| Al | 2.0 | 54.0 | 1.00 | |

This table is based upon calculations explained in Appendix 1. A pressure of 0.11 MPa (1.1 atmosphere) and a temperature of 2350° K. (2080° C.), intermediate between stages 1 and 2, were chosen as the conditions of minimum vaporization and back reaction for calculation purposes. Staged counter-current flow of gases and condensed phases was assumed. Enough additional coke and oxygen are provided to preheat the reactants within the reactor.

Because aluminum volatiles are refluxed and $Al_4C_3$ is recycled, a yield of 100% is theoretically possible. The heating coke to reduction coke ratio is 4.2. The volume ratio of the heating coke to pellet (alumina and reduction coke) is 1.7, and the mass ratio of the same is 1.1.

The heat balance in a preferred embodiment of the method of the invention is summarized in Table 2.

TABLE 2

Heat Balance (1)
Basis: 1 mole $Al_2O_3$ comsumed or
production of 2 moles Al (54 g)

|  | KJ | % |
|---|---|---|
| Heat input and credit | | |
| C and $O_2$ combustion at 2350° K., 12.5 mole (121.2 KJ/mole) | 1515 | 49.0 |
| Cooling of CO offgas, 2350-500° K., 15.5 mole (63.6 KJ/mole) | 986 | 31.9 |
| Stage 2 heat, supplied by electricity | 586 | 19.1 |
|  | 3087 | 100.0 |
| Heat consumption and loss | | |
| Preheat reactants $Al_2O_3$, C, 300-2350° K. | | |
| 1 $Al_2O_3$ (376 KJ/mole) + 3C (43.9 KJ/mole) | 508 | 16.4 |
| ΔH Stage 1 at 2350° K. (2) | 620 | 20.1 |
| ΔH Stage 2 at 2350° K. (3) - supplied by electricity | 586 | 19.1 |
| Preheat C and $O_2$ for burning, 300-2350° K. | | |
| C 12.5 mole (43.9 KJ/mole) | 549 | 17.8 |
| $O_2$ 6.3 mole (73.2 KJ/mole) | 461 | 14.9 |
| Loss in CO, 500-300° K., 15.5 mole | | |

TABLE 2-continued

Heat Balance (1)
Basis: 1 mole $Al_2O_3$ comsumed or
production of 2 moles Al (54 g)

|  | KJ | % |
|---|---|---|
| (5.9 KJ/mole) | 91 | 2.9 |
| Loss in hot product 2350-300° K. | | |
| Al 2 mole (73.6 KJ/mole) | 147 | 4.8 |
| $Al_4C_3$ .12 mole (516.6 KJ/mole) | 62 | 2.0 |
| Radiation losses (4) 2% | 63 | 2.0 |
|  | 3087 | 100.0 |

KJ = kilojoules
Numbers in parentheses refer to notes in Appendix 2.

As noted in Table 2, only 19% of the total heat is provided by electricity. The balance is supplied directly or indirectly from coke-oxygen combustion.

Table 3 compares total energy requirements of the present carbothermic reduction process with energy requirements of average and best Bayer-Hall technology and shows that carbothermic production of Al could reduce energy requirements 35% below those of the best Bayer-Hall technology. An economic or energy credit will be available from excess CO. Table 3 includes data originally published by Battelle Columbus Labs as Report No. PB261-153, dated Aug. 25, 1976, and entitled "Energy Use Patterns in Metallurgical and Non-Metallic Mineral Processing, Phase 9", pages 10-19.

TABLE 3

Energy Comparisons of
Al Production Processes

|  | Bayer-Hall | | Carbothermic Al |
|---|---|---|---|
|  | average (5) | best (5) | by Method of the Present Invention |
| Electrical Energy | | | |
| MJ/kg Al | 63.5 | 50.4 | 32.7 (6) |
| kWh/lb Al | 8.0 | 6.35 | 1.37 |
| Carbon Requirement | | | |
| kg C/kg Al | .545 | .445 | 3.45 |
| lb C/ton Al | 1,990 | 890 | 6,990 |
| Sum of Electrical and Carbon Energy Equivalent (7) | | | |
| MJ/kg Al | 221 | 186 | 121 (8) |
| $10^6$ Btu/ton Al | 190 | 160 | 104 |

Numbers in parentheses refer to notes in Appendix 2.
MJ = megajoules
kWh = kilowatt hours Appendix 1. Mass Balance by Stages*

Basis: 1 mole $Al_2O_3$ - Relative Molar Amounts
T = 2350° K.    P = 1.07 atm

|  | $Al_2O_3$(s) | C(s) | $Al_4C_3$(s) | Al(l) | $Al_4C_3$(g) | Al(g) | $Al_2O$(g) | CO(g) |
|---|---|---|---|---|---|---|---|---|
| input | 1.0000 | 3.00 | | | | | | |
| Stage 1 | 0.4298 | | 0.5065 | | | | | 3.0000 |
| Stage 2 | | | | 2.000 | 0.1208 | 0.1380 | 0.1323 | 1.1572 |

Stage 1          1.1572 CO → 1.1572 CO
         0.6667 $Al_2O_3$ + 3.000 C → 0.3333 $Al_4C_3$ + 2.000 CO
                  0.3333 $Al_2O_3$ → 0.3333 $Al_2O_3$
                  0.1208 $Al_4C_3$ → 0.1208 $Al_4C_3$
         0.1323 $Al_2O$ + 0.08821 CO → 0.07350 $Al_2O_3$ + 0.02940 $Al_4C_3$
         0.1380 Al(g) + 0.06899 CO → 0.02300 $Al_2O_3$ + 0.02300 $Al_4C_3$ $Al_2O_3$(l) + 3 C(s) + 0.1323 $Al_2O$(g) + 0.1380 Al(g) + 1.1572 CO(g) + 0.1208 $Al_4C_3$(s) →
0.4298 $Al_2O_3$(l) + 0.5065 $Al_4C_3$(l) + 3 CO(g)

Stage 2          0.3857 $Al_2O_3$ + 0.3857 $Al_4C_3$ → 2.3144 Al(l) + 1.1572 CO
         0.1764 Al(l) + 0.04410 $Al_2O_3$ → 0.1323 $Al_2O$(g)
                  0.1380 Al(l) → 0.1380 Al(g)
                  0.1208 $Al_4C_3$ → 0.1208 $Al_4C_3$ (in Al product)

0.4298 $Al_2O_3$(l) + 0.5065 $Al_4C_3$(l) → 2.000 Al(l) + 0.1380 Al(g) + 1.1572 CO +

-continued

Appendix 1. Mass Balance by Stages*

0.1323 Al₂O(g) + 0.1208 Al₄C₃(l)

Overall Reaction Stages 1 and 2

$$Al_2O_3 + 3\,C \rightarrow 2\,Al + 3\,CO$$

*This balance excludes C and O₂ required for production of heat by combustion.

Appendix 2. Calculations and Assumptions

1. Enthalpy data used in calculations are as follows at T=2350° K., P=1 atm in KJ per mole:

|  | (s) | (l) | (g) |
|---|---|---|---|
| Al₂O₃ |  | −1298 |  |
| C | 44.0 |  |  |
| Al₂O |  |  | −24.4 |
| Al |  | 73.8 | 369.2 |
| CO |  |  | −41.0 |
| Al₄C₃ | 146.4 | 301.1* |  |

*approximated at T = 2350° K., m.p. = 2408° K. (pure phase)

2. Stage 1 Net Reaction
0.5702 Al₂O₃(l)+3C(s)+0.1323Al₂O(g)+0.138Al(g)+0.1208Al₄C₃(s)→0.5065Al₄C₃(l)+1.8428CO(g)
ΔH= +620 KJ 3. Stage 2 Net Reaction
0.4298Al₂O₃(l)+0.3857Al₄C₃(l)→2.000Al(l)+0.1380Al(g)+1.1572CO(g)+0.1323Al₂O(g)
ΔH= +586 KJ 4. Approximated radiation loss based on 2% calculated loss.

5. PB 261-153, "Energy Use Patterns In Metallurgical and Non-Metallic Mineral Processing, Phase 9", Battelle Columbus Labs., p. 18 (Aug. 25, 1976).

6. Stage 2 Electrical Energy
(586 KJ/54 g Al)/0.33 electricity production efficiency=32.7 MJ/kg Al 7. PB 245-759, "Energy Use Patterns in Metallurgical and Non-Metallic Mineral Processing, Phase 4", Battelle Columbus Labs., p. 10 (June 27, 1975), charges 34.9 MJ per kilogram of petroleum coke which is used in the Al electrical-blast furnace process and 36.7 MJ per kilogram of metallurgical coke which is used in the Al-Si blast furnace.

8. Bayer alumina, see T. R. Beck, "Improvements in Energy Efficiency of Industrial Electrochemical Processes",

| ANL/OEPM-77-2 (January 15, 1977) | = | 49 |
| Coke (3.45 kg C/kg Al) (34.9 MJ/kg C) | = | 120 |
| Electrical energy (see No. 6) | = | 33 |
| CO credit (8.04 kg CO/kg Al) (−10.1 MJ/kg CO) | = | −81 |
|  |  | 121 MJ/kg Al |

While the foregoing description of our invention has been made with reference to a preferred embodiment thereof, persons skilled in the art will understand that numerous changes and modifications can be made therein without departing from the spirit and scope of the following claims.

What is claimed is:

1. A method for the production of aluminum by carbothermic reduction of Al₂O₃, comprising the steps of
   (a) providing a stack-type reactor having an upper reaction zone and a lower reaction zone beneath the upper reaction zone;
   (b) inserting Al₂O₃ and C into the upper reaction zone;
   (c) heating the Al₂O₃ and C in the upper reaction zone by combustion of a portion of the C;
   (d) reacting the Al₂O₃ with C at an elevated temperature in the upper reaction zone to form CO and a first liquid comprising Al₂O₃ and Al₄C₃;
   (e) transferring the first liquid to the lower reaction zone; and
   (f) heating the first liquid in the lower reaction zone to a temperature greater than the temperature in the upper reaction zone, thereby to form CO and a second liquid of Al and C.

2. The method of claim 1 wherein gaseous Al and Al₂O are formed in the lower reaction zone, and further comprising the steps of
   transferring the gaseous Al and Al₂O to the upper reaction zone, and
   reclaiming the gaseous Al and Al₂O in the upper reaction zone.

3. The method of claim 2 wherein the first liquid is transferred to the lower reaction zone by flowing downwardly to said lower reaction zone, and wherein gaseous Al and Al₂O are transferred to the upper reaction zone by being allowed to rise into said upper reaction zone.

4. The method of claim 1 further comprising
   transferring CO formed in step (f) to the upper reaction zone, and
   contacting CO formed in steps (d) and (f) with Al₂O₃ and C in the upper reaction zone.

5. The method of claim 1 further comprising the step of removing CO from the upper reaction zone.

6. The method of claim 5 further comprising feeding the CO to an electric generating facility to produce electricity.

7. The method of claim 1 wherein a portion of the second liquid is removed from the lower reaction zone to a vessel separate from said reactor, Al is separated from Al₄C₃ in said portion and the Al₄C₃ thus separated is returned to the upper reaction zone.

8. The method of claim 1 wherein at least a portion of the Al₂O₃ and C are heated to a temperature of about 2050° C. in the upper reaction zone, and at least a portion of the first liquid is heated to a temperature of about 2100° C. in the lower reaction zone.

9. An energy efficient method for production of aluminum by carbothermic reduction of Al₂O₃, comprising the steps of
   (a) providing a stack-type reactor having an upper reaction zone and a lower reaction zone beneath the upper reaction zone;
   (b) inserting Al₂O₃ and C into the upper reaction zone;

(c) supporting said $Al_2O_3$ and C in the upper reaction zone, thereby to prevent passage of said $Al_2O_3$ and C into the lower reaction zone;

(d) heating the $Al_2O_3$ and C in the upper reaction zone by combustion of a portion of the C;

(e) reacting the $Al_2O_3$ with C in the upper reaction zone at a temperature of about 2050° C. to form CO and a first liquid comprising $Al_2O_3$ and $Al_4C_3$;

(f) transferring the first liquid to the lower reaction zone;

(g) electrically heating the first liquid in the lower reaction zone to a temperature of about 2100° C., thereby to form CO, gaseous Al, gaseous $Al_2O$ and a second liquid of Al and C;

(h) removing a portion of the second liquid from the lower reaction zone to a vessel separate from said reactor, separating Al from $Al_4C_3$ in said portion and returning separated $Al_4C_3$ to the upper reaction zone;

(i) transferring gaseous Al and $Al_2O$ formed in step (g) to the upper reaction zone and reclaiming the Al and $Al_2O$ in the upper reaction zone;

(j) transferring CO formed in step (g) to the upper reaction zone and contacting CO formed in steps (d) and (g) with $Al_2O_3$ and C in the upper reaction zone; and (k) removing CO from the upper reaction zone.

10. The method of claim 9 wherein step (f) is performed by permitting the first liquid to flow downwardly from the upper reaction zone to the lower reaction zone, and steps (i) and (j) are performed by permitting gaseous Al, $Al_2O$ and CO to rise upwardly from the lower reaction zone to the upper reaction zone.

11. The method of claim 1 further comprising supporting said $Al_2O_3$ and C in the upper reaction zone, thereby to prevent passage of said $Al_2O_3$ and C into the lower reaction zone.

12. The method of claim 11 wherein said $Al_2O_3$ and C are supported by a grate.

* * * * *